United States Patent [19]
Thannhuber

[11] 3,825,826
[45] July 23, 1974

[54] MEASURING INSTRUMENT FOR THE MEASUREMENT OF DIRECT CURRENT OR DIRECT CURRENT VOLTAGE

[75] Inventor: Josef Thannhuber, Landau, Germany

[73] Assignee: Firma Hank Einhell, Landau, Germany

[22] Filed: Dec. 4, 1972

[21] Appl. No.: 311,570

[30] Foreign Application Priority Data
Dec. 3, 1971  Germany............................ 2160169

[52] U.S. Cl. .............................................. 324/147
[51] Int. Cl................................................ G01r 1/20
[58] Field of Search ............ 324/146, 147, 154, 156

[56] References Cited
UNITED STATES PATENTS
1,452,591  4/1923  Brogger ............................ 324/146

Primary Examiner—Alfred E. Smith
Attorney, Agent, or Firm—Schuyler, Birch, Swindler McKee & Beckett

[57] ABSTRACT

A measuring instrument for measuring direct current or direct current voltage comprising a synthetic plastic body having first and second parallel chambers; an indicator support member pivotally mounted in the first chamber with a plate of soft magnetic material and an indicator pointer attached thereto; a bar magnet clamped in the second chamber with the longitudinal axis of the magnet lying approximately in the plane of the plate of magnetic material; said magnet determining by virtue of its position with reference to the magnetic plate, the position of the plate and the orientation of the indicator pointer; and a measuring coil surrounding the plastic body in such a manner that when the current or voltage to be measured is conducted through the coil, the field lines of the measuring coil extend approximately perpendicular to the direction of magnetization of the bar magnet; said plastic body and measuring coil being received in a receptacle in a scale supporting member such that the indicator pointer is located immediately in front of the scale.

11 Claims, 3 Drawing Figures

MEASURING INSTRUMENT FOR THE MEASUREMENT OF DIRECT CURRENT OR DIRECT CURRENT VOLTAGE

This invention relates to an instrument for measuring direct current or direct current voltage comprising a measuring mechanism including an indicator support means comprising a soft magnetic material; and an alignment magnet or control magnet which by virtue of its position with respect to the said soft magnetic material determines the position of the soft magnetic material and thereby the orientation of the indicator support means, and further comprising a measuring coil or winding which conducts the respective current or voltage which is to be measured.

A measuring instrument of the above-described type is already known (see "Elektrische Messgeraete and Messeinrichtungen" by A. Palm, Springer, Berlin, Goettingen, Heidelberg, 1948, 3rd edition, pages 48 and 49). In this known measuring instrument a fixed body of iron, which carries the measuring coil or coils, surrounds the indicator support means. Such construction, however, is relatively wasteful of space and in addition results in a relatively high weight.

It is the object of this invention ro provide a measuring instrument of the above-described type which requires a relatively small amount of space and has a relatively low weight.

This object is achieved by providing a measuring instrument of the above-described type wherein the measuring mechanism comprises a body of synthetic plastic material having two separate chambers extending parallel to each other, in the first of which the indicator support means is pivotally mounted, and in the second of which the alignment magnet is fixedly clamped; the measuring mechanism is surrounded by the measuring coil in such a way that the field lines of the magnetic field inside the coil resulting from the flow of current through the measuring coil run approximately perpendicular to the direction of magnetization of the alignment magnet; and a scale support member is provided which receives the measuring mechanism together with the measuring coil in a corresponding receptacle therein.

The invention has the advantage, in comparison with the known measuring instrument considered hereinabove, that a space-saving construction and a low weight are achieved in a relatively simple manner.

According to one useful form of the invention, the soft magnetic material is formed as a thin plate. This results in an especially advantageous light weight arrangement.

According to a further useful form of the invention, the alignment magnet is a bar magnet, with its middle axis or longitudinal axis which extends between the poles lying at least approximately in the plane of the thin plate which forms part of the indicator support means. This likewise mekes possible the achievement of an especially advantageous light weight arrangement.

In accord with a further useful form of the invention, the alignment magnet is firmly clamped in the chamber of the plastic body in which it is received by means of tension members in the form of straps or legs which are integral with the plastic body. This results in the advantage that no special elements besides the plastic body, which must be provided anyway, are necessary to clamp the alignment magnet in place.

According to a further useful form of the invention, the plastic body comprises outwardly extending margins which are recieved in corresponding recesses in the scale support member. This results in an especially simple and functional arrangement for guiding the plastic body with the measuring mechanism into the receptacle in the scale support member.

According to a still further useful form of the invention, the indicator support member is formed of a nonmagnetic material, preferably synthetic plastic, and has pivot pins at its ends, which are received in mounting members which are screwed into the walls of the chamber in the plastic body which receives the indicator support means. This results in the advantage of an especially simple arrangement for mounting of the indicator support means in the plastic body.

According to a further useful embodiment of the invention, the sides of the synthetic plastic body in which the mounting members are placed are formed so that the mounting members can be screwed into the appropriate locations from the outside of the body. This results in the advantage that the mounting members can be attached to the plastic body at the appropriate locations in a simple manner.

According to a further useful embodiment of the invention, the height of the windings of the measuring coil is less than the height of the plastic body, and the portions of the plastic body sidewalls which are not covered by the measuring coil are received in a mating recess in the scale support member. This results in the advantage of an additional guide for guiding the measuring mechanism into place in the scale support member as well as the advantage of firmly clamping the measuring coil in place on the plastic body of the measuring mechanism.

According to a still further useful embodiment of the invention the receptacle of the scale support member is adapted to receive the measuring mechanism and the measuring coil from the direction of the scale side of the scale support member, i.e., from the direction of the scale face, and at least two special openings are provided in the rear wall of the receptacle through which to extend the measuring coil connections. This results in a simple arrangement for connecting up the measuring coil in an advantageous manner.

According to a still further useful form of the invention, the receptacle is of such depth that when the measuring mechanism is inserted therein, the indicator pointer on the indicator support means is located immediately in front of the scale on the scale support member. This results in the advantage that the indicator support means may be inserted into the scale support member without the neccesity of an additional special adjustment operation.

BRIEF DESCRIPTION OF THE DRAWINGS

The invention will be explained hereinafter in greater detail with reference to the following drawings.

DESCRIPTION OF THE PREFERRED EMBODIMENT

Figure 1:
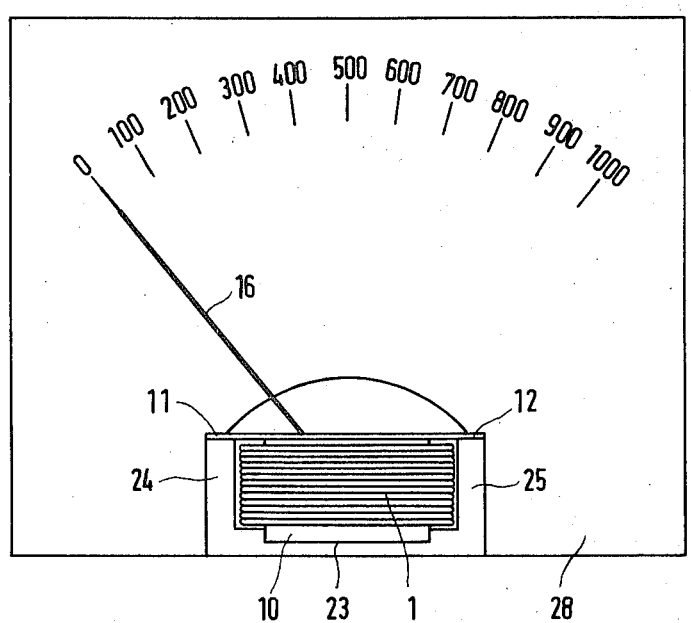
FIG. 1 shows a front view of a measuring instrument according to the present invention.

The measuring instrument shown in FIG. 1 for measuring direct current or direct current voltage comprises a measuring mechanism, generally designated by reference numeral 10, surrounded by a measuring coil 1 through which the current or voltage which is to be measured is conducted. The measuring mechanism 10 and the measuring coil 1 which surrounds it, are inserted in a corresponding cavity in scale support member 28. The cavity in the scale support member 28 comprises a receptacle 29 of which FIG. 1 shows the side walls 24 and 25 and the bottom wall 23. The measuring mechanism 10 is received with its outwardly extending margins 11 and 12 in corresponding recesses or slots located above the side portions 24 and 25 of the receptacle 29 in the scale support member 28. The measuring mechanism 10 is thereby inserted or placed in the scale support member 28 in such a way that the indicator or pointer 16 which is associated with measuring mechanism is located directly in front of the scale of the scale support member.

Figure 2:
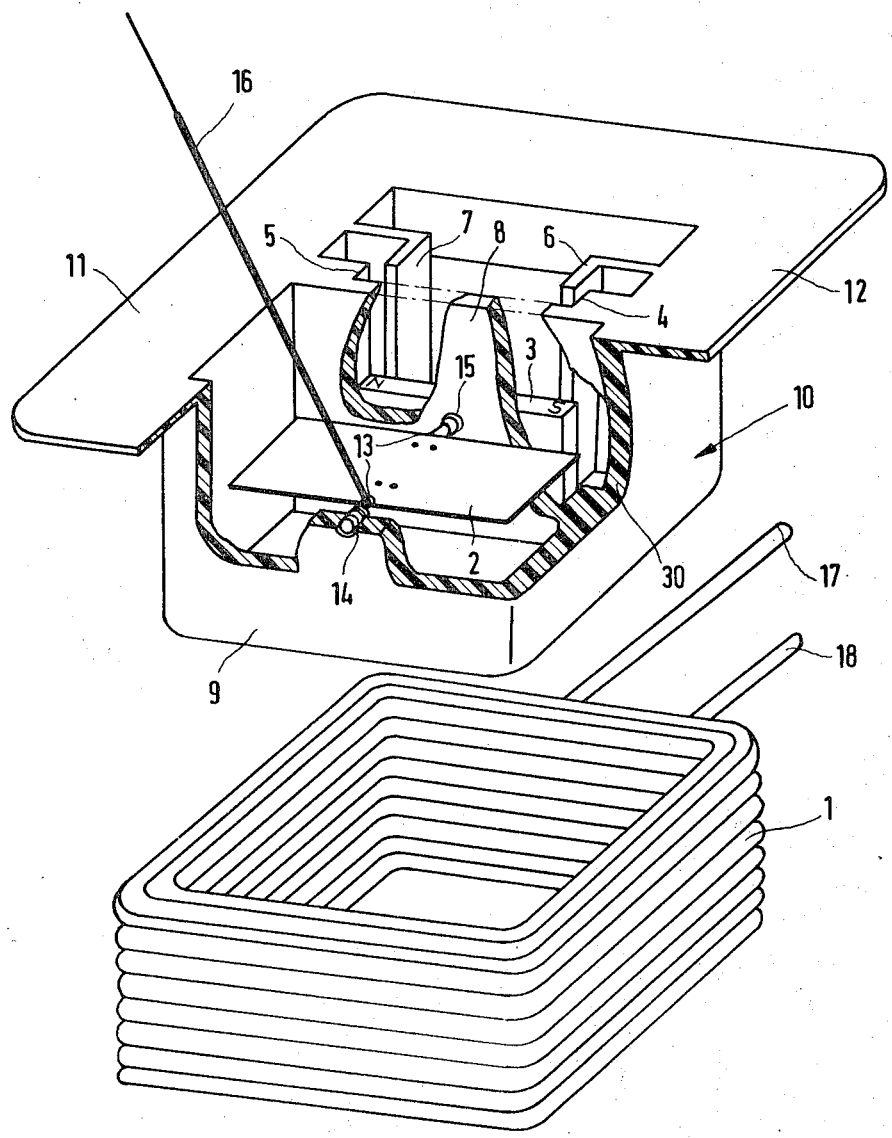
FIG. 2 shows in enlarged scale an exploded representation of a perspective view partially in section of a measuring mechanism and a measuring coil for the measuring instrument of FIG. 1.

In FIG. 2 the measuring mechanism 10 and the measuring coil 1 are represented in perspective and in enlarged scale. The measuring coil 1 is shown removed from the measuring mechanism 10. The measuring mechanism 10 comprises a synthetic plastic body 30 which has two separate chambers extending parallel to each other. In the first chamber an indicator support means is pivotally mounted which comprises the elements 2, 13 and 16 which are visible in FIG. 2. Reference numeral 2 designates a small, thin, elongated plate of a soft magnetic material such as soft iron. Reference numeral 13 designates pivot pins which are located at the ends of the actual indicator support member to which plate 2 is attached. Reference numeral 16 designates the indicator pointer associated with the indicator support means as previously referred to in conjunction with FIG. 1. The four points shown on plate 2 represent the connection of plate 2 to the actual indicator support piece, which preferably comprises synthetic plastic material and which may be formed with the pivot pins 13 and the indicator pointer 16 attached.

In the second chamber of the plastic body 30 is housed an alignment or control magnet 3. This alignment magnet 3 is firmly clamped in the second chamber adjacent a separating wall 8 which extends between the two chambers of the plastic body 30 by tension members 6 and 7 in the form of straps or legs integral with the plastic body. The lower portion of this separatin wall 8 can be formed so that it prevents the alignment magnet 3 from being pushed through from the top of the plastic body 30. The appropriate stop can be formed by a small nose extending outwardly from the separating wall 8 which fixes a corresponding pivot point for the alignment magnet 3.

The alignment magnet 3 exerts an attractive force on the plate 2 composed of soft magnetic material, as a result of which when no current passes through the measuring coil 1 which surrounds the measuring unit 10, the plate 2 and thereby the indicator pointer 16 are held in a definite position by the magnet. The alignment magnet is firmly clamped in the chamber of the plastic body 3 in which it is received in such a position that the middle axis or longitudinal axis of the magnet running between the north and south poles lies at least approximately in the plane of the thin plate 2 which forms part of the indicator support means. At this point it should be noted that contrary to the relationships depicted in FIG. 2, one can also proceed so that the plate 2 extends parallel to the alignment magnet 3 instead of lying perpendicular thereto. Further it should be noted, that the alignment magnet 3, as it is shown in FIG. 2, is restricted against motion in the direction of its magnetization (the longitudinal direction) by shoulders 4 and 5 formed next to the separating wall 8 so that the opposing outer faces of the alignment magnet 3 lie practically adjacent thereto. The indicator support member is mounted with its pivot pins 13 in mounting members 14 and 15 which are screwed into the walls of the plastic body 30. Mounting member 13 is screwed into the outer wall of the plastic body shown in FIG. 2 as the forward wall, and mounting member 15 is screwed into the aforementioned separating wall 8. The mounting member 15 is screwed into the separating wall 8 before the alignment magnet 3 is clamped in position in the second chamber of the plastic body 30. Under such circumstances, the screw location for the mounting member 15 in separating wall 8 is accessible from the direction of the outer wall of the plastic body 30 which is shown in FIG. 2 as the rear wall. The said rear outer wall of the plastic body 30 is, as shown in FIG. 2, provided with an opening or cutout in the appropriate region to facilitate access.

When the measuring coil 1 is placed surrounding the plastic body 30 of the measuring mechanism 10, the field lines of the magnetic field of the measuring coil 1 which lie inside the coil when current is passed therethrough, are oriented at least approximately perpendicular to the direction of magnetization of the alignment magnet 3. The plate 2 of soft magnetic material attached to the indicator support means assumes a position which corresponds to the resultant field component which results from the fields of the alignment magnet 3 and the measuring coil 1. When the measuring coil field disappears, then only the attractive force of the alignment magnet 3 is exerted on plate 2, as a result of which plate 2 and the associated indicator pointer 16 return to their initial positions.

Figure 3:
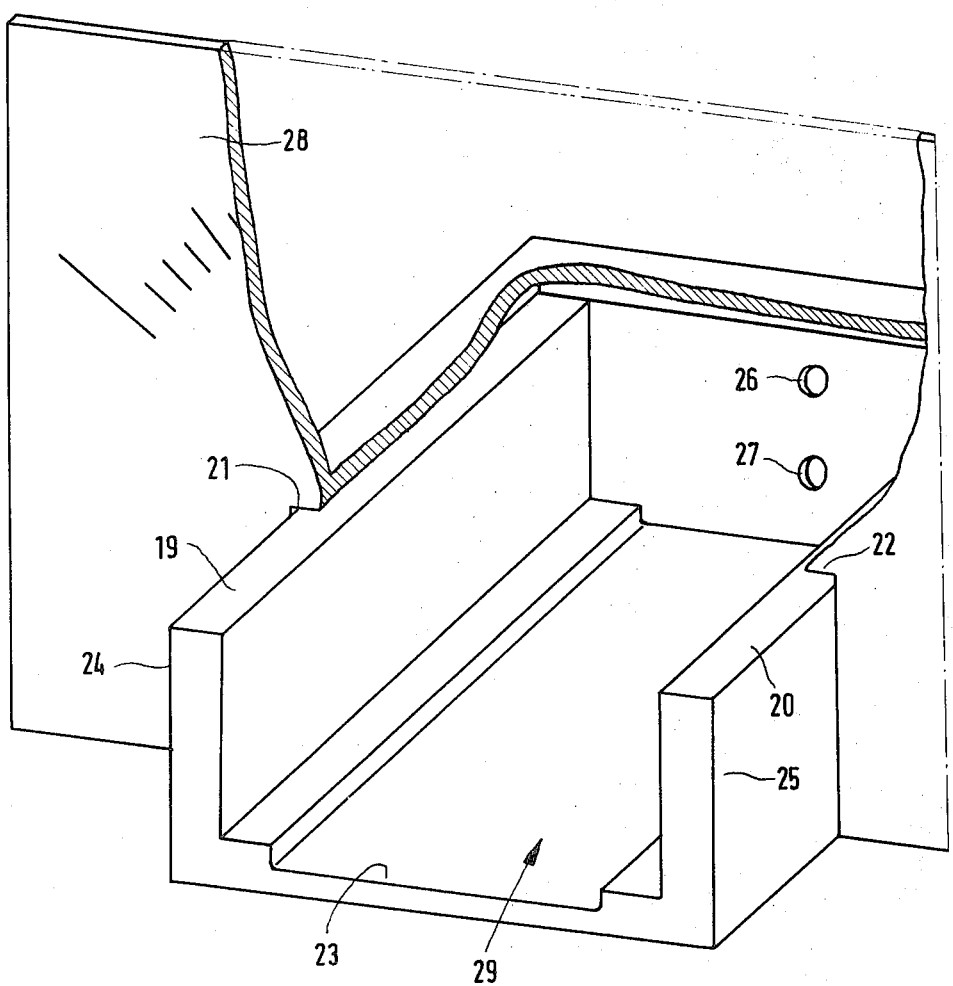
FIG. 3 shows a perspective view partially in section of a scale support member for receiving the measuring mechanism and the measuring coil shown in FIG. 2.

In FIG. 3 the scale support member 28, which receives the measuring mechanism 10 and the measuring coil 1 of FIG. 2, is shown in greater detail in a perspective view. In order to make the special features of the scale support member 28 visible, it is shown in FIG. 3 partially in section. As explained hereinabove in conjunction with FIG. 1, the scale support member 28 comprises a receptacle 29 which has side walls 24 and 25 and a lower wall 23. The bottom wall 23 includes a recess which is adapted to receive the lower portion of the plastic body 30 of the measuring mechanism 10. The plastic body 30 lies with its outwardly extending margins 11 and 12 on guide surfaces 19 and 20 of the respective walls 24 and 25 of the scale support member 28, when it is inserted in the scale support member, i.e., in the receptacle 29 in the scale support member 28, as can be seen from FIG. 3. By means of the shoulders 21 and 22 formed on the scale support member 28, the outwardly extending margins 11 and 12 of the plastic body 30 are held by pressure against the guide surfaces 19 and 20 of the respective side walls 24 and 25 of the scale support member 28. Shoulders 21 and 22 need not be joined in a straight line as can be seen by FIG. 1 where they are joined by a curve. The measuring coil connections 17 and 18, shown in FIG. 2, extend through the openings 26 and 27 in the rear wall of receptacle 29. The receptacle 29 which forms part of the scale support member 28 is of such depth that when the measuring mechanism 10 is inserted into the receptacle, the indicator pointer 16 is located immediately in front of the scale on the scale support member 28. As can be seen from FIG. 1, when the measuring unit 10 is inserted in the receiving container 29, the measuring coil 1 surrounds that portion of the plastic body 30 which remains above the recess in the bottom wall 23 of scale support member 28.

Since modification of the preferred embodiment occur to those skilled in the art, the scope of the invention is to be limited solely by the scope of the appended claims.

What is claimed is:

1. In a measuring instrument for the measurement of a direct current or direct current voltage which comprises a measuring unit and a measuring coil for conducting the voltage or current to be measured; said measuring unit comprising an indicator support means containing a soft magnetic material and an alignment magnet which by virtue of its position with reference to the indicator support means determines the position of the indicator support means; said measuring coil being disposed so that the field lines of its magnetic field are at least approximately perpendicular to the direction of magnetization of the alignment magnet; the improvement comprising said measuring unit with its indicator support means an alignment magent being disposed inside of said measuring coil; said measuring unit further comprising a body of synthetic plastic material comprising first and second separate chambers extending parallel to each other; said indicator support means being pivotable mounted in said first chamber and said alignment magnet being firmly clamped in said second chamber; and said measuring instrument being provided with a scale supporting member adapted to receive the measuring unit together with the measuring coil in a corresponding cavity therein.

2. A measuring instrument as recited in claim 1 wherein the soft magnetic material is formed as a thin plate.

3. A measuring instrument as recited in claim 2 wherein the alignment magnet is a bar magnet and middle axis of the magnet extending between the north and south poles thereof lies at least approximately in the plane of the plate which forms part of the indicator support member.

4. A measuring instrument as recited in claim 1 wherein the alignment magnet is firmly clamped in the chamber in which it is received by means of tension members integral with the plastic body.

5. A measuring instrument as recited in claim 1 wherein the plastic body comprises outwardly extending margins which are received in corresponding recesses in the scale support member.

6. A measuring instrument as recited in claim 1 wherein the indicator support means comprises non-magnetic material and further comprises pivot pins at the ends thereof which are received in mounting members which are screwed into the walls of the chamber of the plastic body provided for receiving the indicator support means.

7. A measuring instrument as recited in claim 6 wherein the non-magnetic material comprises a synthetic plastic.

8. A measuring instrument as recited in claim 6 wherein the walls of the synthetic plastic body which receive the mounting members are so formed that the mounting members can be screwed into the respective walls of the plastic body from the outside.

9. A measuring instrument as recited in claim 1 wherein the height of the windings of the measuring coil is less than the height of the plastic body and the portions of the plastic body sidewalls which are not covered by the measuring coil are received in a corresponding recess in the scale support member.

10. A measuring instrument as recited in claim 1 wherein a receptacle is provided attached to the scale support member adapted to receive the measuring mechanism and the measuring coil from the direction of the scale face; said receptacle having at least two special openings through which the measuring coil connections are extended.

11. A measuring instrument according to claim 10 wherein the receptacle is of such depth that when the measuring mechanism is inserted therein the indicator pointer of the indicator support means is located immediately in front of the scale on the scale support member.

* * * * *

UNITED STATES PATENT OFFICE
CERTIFICATE OF CORRECTION

Patent No. 3,825,826             Dated July 23, 1974

Inventor(s) Josef Thannhuber

It is certified that error appears in the above-identified patent and that said Letters Patent are hereby corrected as shown below:

Page 1, column 1, line 6, that portion of the name of the assignee which reads "Hank" should read -- Hans --; line 20, that portion of the name of the firm which reads "McKee" should read -- McKie--.

Column 1, line 25, "ro" should read -- to --; line 59 "mekes" should read -- makes --.

Column 3, lines 54-55, "separatin" should read -- separating --.

Column 5, line 34, "an" should read -- and --; line 39, "pivotable" should read -- pivotably --.

Signed and sealed this 8th day of October 1974.

(SEAL)
Attest:

McCOY M. GIBSON JR.
Attesting Officer

C. MARSHALL DANN
Commissioner of Patents